(12) United States Patent
Tsuchiya et al.

(10) Patent No.: US 9,375,900 B2
(45) Date of Patent: Jun. 28, 2016

(54) LAMINATED GLASS AND ITS PRODUCTION PROCESS

(71) Applicant: ASAHI GLASS COMPANY, LIMITED, Chiyoda-ku (JP)

(72) Inventors: Masahiro Tsuchiya, Chiyoda-ku (JP);
Yasumasa Kato, Chiyoda-ku (JP);
Yutaka Kitajima, Chiyoda-ku (JP);
Masashi Kasajima, Chiyoda-ku (JP);
Shuichi Akada, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 270 days.

(21) Appl. No.: 14/043,228

(22) Filed: Oct. 1, 2013

(65) Prior Publication Data
US 2014/0065374 A1    Mar. 6, 2014

Related U.S. Application Data

(63) Continuation of application No. PCT/JP2012/058994, filed on Apr. 2, 2012.

(30) Foreign Application Priority Data

Apr. 1, 2011  (JP) ................................. 2011-082103
Sep. 28, 2011 (JP) ................................. 2011-212238

(51) Int. Cl.
*B32B 17/06* (2006.01)
*B60J 1/00* (2006.01)
(Continued)

(52) U.S. Cl.
CPC ........... *B32B 17/06* (2013.01); *B32B 17/10036* (2013.01); *B32B 17/10119* (2013.01);
(Continued)

(58) Field of Classification Search
CPC .............. B32B 17/06; B32B 17/10119; B32B 17/10761; B32B 17/10036; C03B 23/203; C03B 23/023; C03B 40/033; C03B 23/0256; C03B 23/0252; C03C 3/087; B60J 1/008; Y10T 428/24628
See application file for complete search history.

(56) References Cited

U.S. PATENT DOCUMENTS

5,928,793 A     7/1999  Kimura
2006/0217257 A1  9/2006  Nagashima et al.
2009/0000335 A1* 1/2009  Urata ...................... C03C 3/087
                                      65/134.2

FOREIGN PATENT DOCUMENTS

DE  1 068 865        11/1959
GB  2 078 169 A       1/1982
(Continued)

OTHER PUBLICATIONS

U.S. Appl. No. 14/100,326, filed Dec. 9, 2013, Kitajima.
(Continued)

*Primary Examiner* — Laura Auer
(74) *Attorney, Agent, or Firm* — Oblon, McClelland, Maier & Neustadt, L.L.P (57) ABSTRACT

To provide laminated glass excellent in the quality and the cost, in which two glass plates differing in the plate thickness can easily be bent with good accuracy.
Laminated glass 60 comprising a plurality of glass plates 12 and 14 bent into a predetermined shape, and an interlayer 40 interposed between the plurality of glass plates 12 and 14, at least two glass plates 12 and 14 among the plurality of glass plates 12 and 14 differing in the plate thickness, wherein the two glass plates 12 and 14 differing in the plate thickness have different glass compositions, and at an optional temperature between the annealing point and the softening point of the thick glass plate 12, the thick glass plate 12 has a lower viscosity than the thin glass plate 14.

16 Claims, 7 Drawing Sheets

(51) Int. Cl.
*C03B 23/023* (2006.01)
*C03B 23/203* (2006.01)
*C03B 23/025* (2006.01)
*C03C 3/087* (2006.01)
*B32B 17/10* (2006.01)
*C03B 40/033* (2006.01)

(52) U.S. Cl.
CPC ........... *B32B17/10761* (2013.01); *B60J 1/008* (2013.01); *C03B 23/023* (2013.01); *C03B 23/0252* (2013.01); *C03B 23/0256* (2013.01); *C03B 23/203* (2013.01); *C03B 40/033* (2013.01); *C03C 3/087* (2013.01); *Y10T 428/24628* (2015.01)

(56) References Cited

FOREIGN PATENT DOCUMENTS

| | | |
|---|---|---|
| JP | 57-61646 | 4/1982 |
| JP | 10-101367 | 4/1998 |
| JP | 2004-137147 | 5/2004 |
| WO | 2007/111079 | 10/2007 |

OTHER PUBLICATIONS

International Search Report issued Jun. 19, 2012 in PCT/JP2012/058994 filed Apr. 2, 2012.

Extended European Search Report issued Aug. 14, 2014, in European Patent Application No. 12767308.5.

\* cited by examiner

LAMINATED GLASS AND ITS PRODUCTION PROCESS

TECHNICAL FIELD

The present invention relates to laminated glass and its production process.

BACKGROUND ART

As window glass for an automobile, laminated glass having two glass plates bent into a predetermined shape and an interlayer interposed between the two glass plates has been widely used. The two glass plates have the same glass composition and the same plate thickness from the viewpoint of the cost. The interlayer is constituted by a resin such as polyvinyl butyral (PVB) and prevents the broken glass from flying.

As a forming method of bending glass plates into a predetermined shape, commonly employed is a gravity forming method of placing the glass plates on a ring-shape lower mold (ring mold) supporting the glass plates from below and passing them through a heating furnace to heat and soften the glass plates and bend the glass plates by gravity into shape along the ring mold. A pressing method of sandwiching the glass plates preliminarily formed by gravity between the ring mold and a press mold, followed by pressing for main forming may also be employed.

In such a forming method, it is economically efficient to place the two glass plates overlaid each other on the ring mold and bending them simultaneously. In such a case, between the two glass plates, a release agent containing a ceramic powder is preliminarily applied.

In recent years, thickness reduction of laminated glass has been studied for the purpose of weight saving of an automobile (for example, Patent Document 1). Patent Document 1 proposes to make the glass plate on the car exterior side thicker than the glass plate on the car interior side, considering a collision of flying objects such as small stones from outside with the automobile.

Window glass for an automobile is formed in a convex curved shape toward the car exterior side at the time of attachment to a vehicle. In a case where the glass plate on the car exterior side is thicker than the glass plate on the car interior side, a thick glass plate and a thin glass plate are overlaid in this order on the ring mold, followed by heating and softening to bend them into a downwardly convex shape.

PRIOR ART DOCUMENT

Patent Document

Patent Document 1: JP-A-2003-55007

DISCLOSURE OF INVENTION

Technical Problem

However, in a case where the two glass plates have different plate thicknesses, since the two glass plates have different bendabilities, it is difficult to bend the two glass plates similarly, and various problems will arise.

For example, in a case where a thick glass plate and a thin glass plate are overlaid in this order on a ring mold, the thin glass plate is likely to deform and sag down as compared with the thick glass plate, and the following problems (1) and (2), etc. may arise.

(1) The glass plates and the interlayer are not sufficiently pressure bonded, thus leading to pressure bonding failure.

(2) Irregularities by the release agent or the like are transferred to the thin glass plate and remain as deformation on the glass plate even after bending, thus impairing the visual quality.

Whereas, it may be considered to heat the two glass plates at different temperatures and bend them, so as to bend the two glass plates differing in the plate thickness similarly, however, when the two glass plates are overlaid on the ring mold, application of a temperature difference to the glass plates itself is difficult.

Further, in a case where the two glass plates differing in the plate thickness are individually placed on separate ring molds and separately subjected to bending, it is necessary to change the temperature distribution in the heating furnace in which the glass plate is subjected to heat treatment or to change the shape of the ring mold in accordance with the plate thicknesses of the glass plates, such being uneconomical.

As mentioned above, laminated glass having glass plates differing in the plate thickness is problematic in the quality and the cost.

Under these circumstances, the object of the present invention is to provide laminated glass excellent in the quality and the cost and its production process capable of easily bending glass plates differing in the plate thickness with good accuracy, whereby the glass plates and the interlayer are sufficiently pressure bonded in the pressure bonding step and in addition, distortion of the glass plates is reduced.

Solution to Problem

To achieve the above object, the present invention provides laminated glass comprising a plurality of glass plates bent into a predetermined shape, and an interlayer interposed between the plurality of glass plates, at least two glass plates among the plurality of glass plates being a thick glass plate and a thin glass plate differing in the plate thickness; wherein at an any temperature between the annealing point and the softening point of the thick glass plate, the thick glass plate between the two glass plates differing in the plate thickness, has a lower viscosity than the thin glass plate.

In this specification, among the two glass plates differing in the plate thickness constituting the laminated glass, a thicker glass plate will be referred to as a thick glass plate, and a thinner glass plate will be referred to as a thin glass plate.

The present invention further provides a process for producing laminated glass, which comprises a forming step of heating a plurality of glass plates to the vicinity of the softening point and bending them into a predetermined shape; a lamination step of laminating the plurality of bent glass plates with an interlayer interposed therebetween; and a pressure bonding step of pressure bonding the laminated glass plates and the interlayer to form laminated glass; at least two glass plates among the plurality of glass plates constituting the laminated glass differing in the plate thickness; wherein at an any temperature between the annealing point and the softening point of the thick glass plate, the thick glass plate between the two glass plates differing in the plate thickness, has a lower viscosity than the thin glass plate.

Advantageous Effects of Invention

According to the present invention, it is possible to provide laminated glass excellent in the quality and the cost and its production process capable of easily bending glass plates differing in the plate thick with good accuracy, whereby distortion of the glass plates is reduced.

DESCRIPTION OF EMBODIMENTS

Now, the present invention will be described in detail with reference to drawings. However, it should be understood that the present invention is by no means restricted to the following embodiment, and various changes and modifications are possible without departing from the intention and the scope of the present invention.

For example, the type of glass plates of the laminated glass according to an embodiment of the present invention is soda lime glass, however, the type of the glass plates of the present invention is not limited, and for example, alkali-free glass may be employed.

The thin glass plate and the thick glass plate constituting the laminated glass according to this embodiment specifically preferably have the glass compositions according to the following first and second embodiments, as represented by mass % as calculated as oxides.

First Embodiment

The thin glass plate is a soda lime glass plate having a composition comprising:
$Al_2O_3$: 0 to 3.5 mass %, and
$Na_2O$ and $K_2O$ in total: 12.0 to 14.5 mass %; and
the thick glass plate is a soda lime glass plate having a composition comprising:
$Al_2O_3$: 0 to 2.0 mass %, and
$Na_2O$ and $K_2O$ in total: 13.0 to 15.5 mass %.

Second Embodiment

The thin glass plate is a glass plate having a composition comprising:
$SiO_2$: 68.0 to 75.0 mass %,
$Al_2O_3$: 0 to 3.5 mass %,
CaO: 7.0 to 13.0 mass %,
MgO: 0 to 7.0 mass %,
$Na_2O$: 12.0 to 15.0 mass %,
$K_2O$: 0 to 3.0 mass %,
$Na_2O$ and $K_2O$ in total: 12.0 to 14.5 mass %, and
$Na_2O$ and $K_2O$ in total: 13.0 to 15.5 mass %; and
the thick glass plate is a glass plate having a composition comprising:
$SiO_2$: 68.0 to 75.0 mass %,
$Al_2O_3$: 0 to 2.0 mass %,
CaO: 7.0 to 13.0 mass %,
MgO: 0 to 7.0 mass %,
$Na_2O$: 12.0 to 15.0 mass %,
$K_2O$: 0 to 3.0 mass %, and
$Na_2O$ and $K_2O$ in total: 13.0 to 15.5 mass %.

$Al_2O_3$ is a component to secure the weather resistance, and its content is preferably at least 1.7 mass %, more preferably at least 1.8 mass %. Further, if it exceeds 4.0 mass %, the viscosity tends to be high, and melting may be difficult. From such a viewpoint, it is more preferably at most 3.5 mass %, particularly preferably at most 3.3 mass %.

$Na_2O$ is a component to improve the melting property, and if its content is lower than 12.6 mass %, the melting property may be decreased. It is more preferably at least 12.8 mass %, particularly preferably at least 13.0 mass %. Further, if it exceeds 15.0 mass %, the weather resistance may be decreased. It is more preferably at most 14.8 mass %, particularly preferably at most 13.8 mass %.

$K_2O$ is a component to improve the melting property, and its content is preferably at least 0.5 mass %, more preferably at least 0.9 mass %. Further, if it exceeds 2.0 mass %, the weather resistance may be decreased, and the cost of the glass plate will be high. It is more preferably at most 1.8 mass %, particularly preferably at most 1.6 mass %.

The soda lime glass plate according to the above first embodiment means a glass plate made of soda lime glass containing $SiO_2$, CaO, $Na_2O$ and $K_2O$ as the main components, containing at least from 65 to 75 mass % of $SiO_2$ and from 7 to 14 mass % of CaO, and further containing $Al_2O_3$, $Na_2O$ and $K_2O$ within the above ranges.

In this specification, "to" used to show the range of the numerical values is used to include the numerical values before and after it as the lower limit value and the upper limit value, and unless otherwise specified, the same applies hereinafter.

(Process for Producing Laminated Glass)

Figure 1:
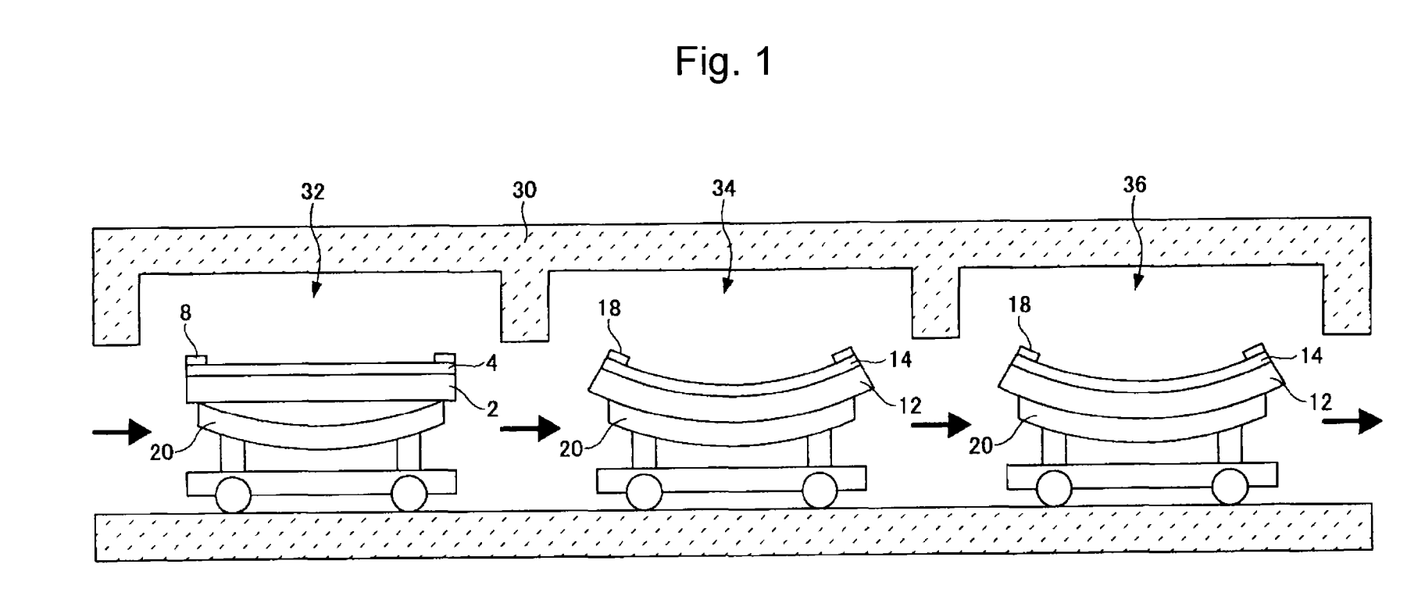
FIG. 1 is a view (1) illustrating a process for producing laminated glass according to an embodiment of the present invention.
Figure 2:
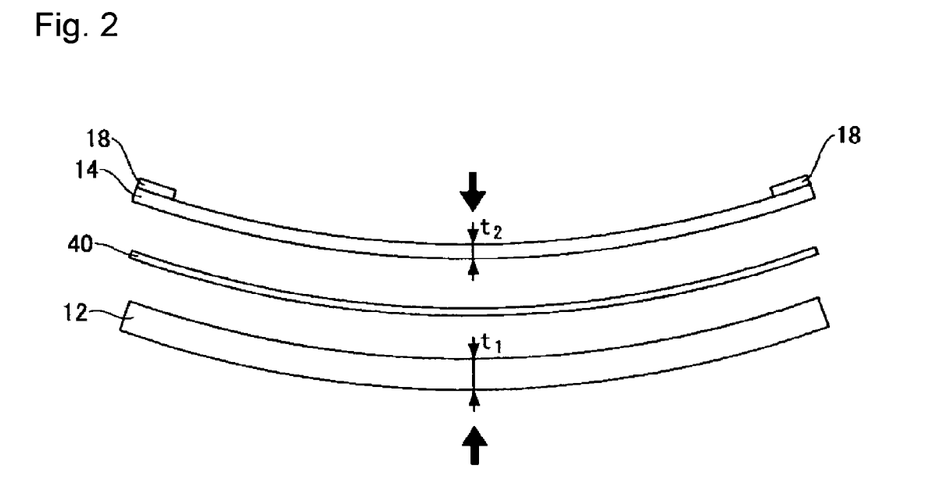
FIG. 2 is a view (2) illustrating a process for producing laminated glass according to one embodiment of the present invention.
Figure 3:
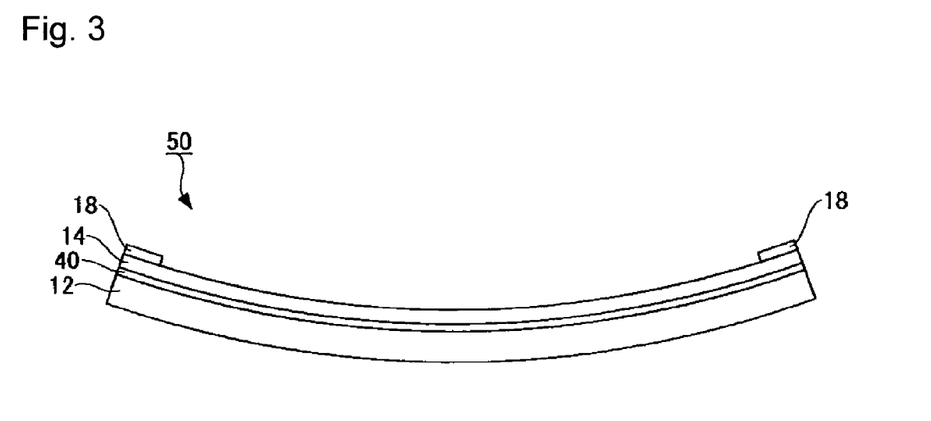
FIG. 3 is a side view illustrating a glass laminate according to an embodiment of the present invention.
Figure 4:
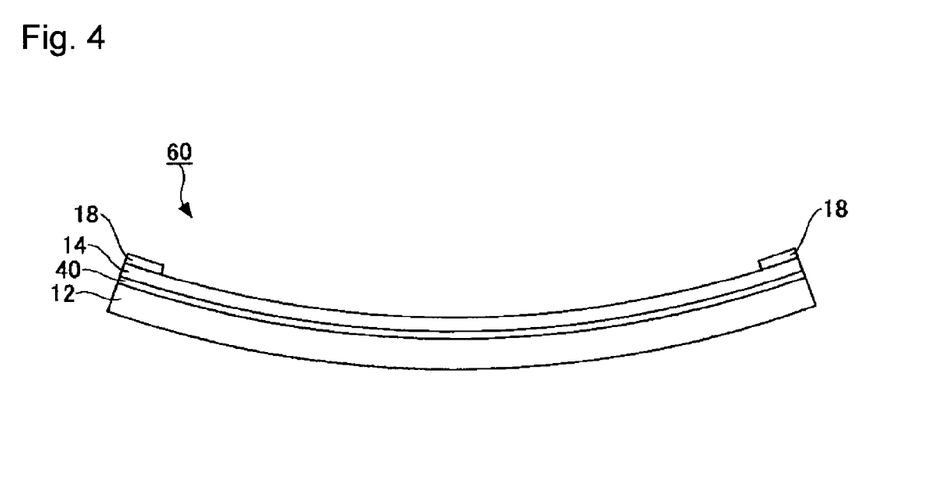
FIG. 4 is a side view illustrating laminated glass according to an embodiment of the present invention.

FIGS. 1 and 2 are views illustrating a process for producing laminated glass according to an embodiment of the present invention. FIG. 1 is a view illustrating the forming step, and is a longitudinal cross section illustrating a heating furnace. FIG. 2 is a view illustrating the lamination step. FIG. 3 is a side view illustrating a glass laminate according to an embodiment of the present invention. FIG. 4 is a side view illustrating laminated glass according to an embodiment of the present invention.

The process for producing laminated glass comprises a forming step, a lamination step and a pressure bonding step, at least two glass plates among a plurality of glass plates constituting the laminated glass differing in the plate thickness. The plate thickness and the glass composition of each of the plurality of glass plates and the plate thickness ratio of the plurality of glass plates do not substantially change as between before and after the respective steps such as the forming step.

The forming step is a step of heating the plurality of glass plates differing in the plate thickness to the vicinity of the softening point of a glass plate having a higher softening point i.e. a thinner glass plate and bending them to a predetermined shape. In the forming step, for example, a gravity forming method is employed wherein the glass plates are placed on a ring mold and passed through a heating furnace to heat and soften them whereby to bend them into a predetermined shape by gravity. A press forming method of sandwiching the glass plates preliminarily formed by gravity between the ring mold and a press mold, followed by pressing for main forming may also be employed.

Otherwise, a method may also be employed wherein glass plates heated to a predetermined temperature while being horizontally transferred on a plurality of rolls provided in the heating furnace are lifted up by the ring mold and brought close to a bending mold to form them into a shape along the bending mold.

In the forming step, for example, as shown in FIG. 1, it is economically efficient to place a plurality of glass plates 2 and 4 overlaid via a release agent on a ring mold 20 and bend them simultaneously. The plurality of glass plates 2 and 4 placed on the ring mold 20 are arranged one above the other, and between the adjacent glass plates, a release agent is applied.

The release agent is to separate the adjacent glass plates so that they are easily separated from each other after forming. As the release agent, a ceramic powder or the like which will not react with the glass plate or which will not melt at high temperature may be suitably used.

The plurality of glass plates 2 and 4 placed on the ring mold 20 in the gravity forming method include two glass plates differing in the plate thickness, and the thicker glass plate may be disposed on the lower side. In a case where three or more glass plates are placed on the ring mold 20, and there may be glass plates having the same plate thickness, the glass plates having the same plate thickness are disposed adjacent to each other.

On the other hand, among the plurality of glass plates 2 and 4 placed on the ring mold 20, the thinner glass plate may be disposed on the lower side. In such a case, vertical disposition of bent glass plates 12 and 14 is reversed and they are laminated, whereby it is possible to prevent irregularities on the glass plate 14 due to contact with the ring mold 20 from being exposed to the outside. Further, even in a case where there is a slight difference in the forming property between the plurality of glass plates 2 and 4 or in a case where their forming properties are intentionally differentiated, by optionally changing vertical disposition of the glass plates 2 and 4, optimum forming procedure can be selected in accordance with bendability of the plurality of glass plates.

In the forming step, it is possible to place the plurality of glass plates 2 and 4 individually on separate ring molds 20 and bending them separately, and in such a case, the release agent is unnecessary. In such a case, heretofore, it has been necessary to change the temperature distribution in a heating furnace 30 or to use different ring molds 20 in accordance with the plate thicknesses of the glass plates, however, according to this embodiment, it is unnecessary to do so. This is because the bendabilities of a thick plate and a thin plate in the forming temperature region are substantially the same, which will be described in detail hereinafter.

The ring 20 is a supporting mold formed into a ring-shape, which supports the plurality of (for example, two) glass plates 2 and 4 from below. The ring mold 20 is guided in a predetermined direction along a rail in the interior of the heating furnace 30. The interior of the heating furnace 30 is compartmentalized into a plurality of zones such as a pre-heating zone 32 of pre-heating the glass plates, a forming zone 34 of bending the glass plates and an annealing zone 36 of annealing the glass plates. In each zone, a heater or the like is provided so as to control the temperature in each zone.

The ring mold 20 passes through the pre-heating zone 32, the forming zone 34 and the annealing zone 36 in this order. The temperature in the forming zone 34 is set to a temperature (usually from 550 to 650° C.) suitable for bending of the glass plates, and in the forming zone 34, the glass plates are bent into a shape along the ring mold 20.

The ring mold 20 is formed into a frame-shape, and supports the periphery of the glass plates. The ring mold 20 may be a unit or may be divided in a circumferential direction. In the latter case, a plurality of divided pieces constituting the ring mold may relatively be moved or moved rotationally as the case requires to obtain a predetermined shape. Further, rings partially differing in the curvature are overlaid in parallel with each other, and the supporting rings may be changed in accordance with the degree of bending of the glass plate.

In such a manner, in the forming step, the plurality of flat glass plates 2 and 4 are bent to obtain a plurality of glass plates 12 and 14 having a predetermined shape. The obtained plurality of glass plates 12 and 14 are sufficiently cooled and cleaned as the case requires (for example, to remove the release agent) and then subjected to a lamination step.

The lamination step is a step of laminating the plurality of bent glass plate 12 and 14 with an interlayer 40 interposed therebetween, as shown in FIG. 2. By this step, a glass laminate (non-pressure bonded product) 50 is obtained as shown in FIG. 3. The glass laminate 50 includes the two glass plates 12 and 14 differing in the plate thickness. In this specification, the glass laminate means a non-pressure bonded laminated before the pressure bonding step, in a state where the plurality of glass plates are laminated with an interlayer interposed therebetween, and is distinguished from the laminated glass obtained by the pressure bonding step.

The interlayer 40 is constituted by a resin such as polyvinyl butyral (PVB), and is interposed between the adjacent glass plate 12 and 14. The interlayer 40 prevents the broken glass from flying, when the after-mentioned laminated glass 60 is broken.

In the lamination step, a plurality of (for example, two) glass plates 12 and 14 in conformity with each other in the shape may be selected among the plurality of bent glass plates and laminated. For example, the plurality of glass plates 12 and 14 simultaneously bent on one ring mold 20 may be respectively pressure bonded with glass plates of a different pair to prepare laminated glass.

In the lamination step, in order that bubbles are easily removed from between the glass plates 12 and 14 and the interlayer 40 and to prevent pressure bonding failure between the glass plates and the interlayer, the two glass plates 12 and 14 to be laminated are preferably laminated so that the concave curved surface of the glass plate 12 having a large radius of curvature and the convex curved surface of the glass plate 14 having a small radius of curvature face each other. Here, "the convex curved shape" means a protruded curved surface of a glass plate, and "the concave curved surface" means a dent curved surface of a glass plate. The difference in the radius of curvature between the two glass plates 12 and 14 is slight.

In the lamination step, the plurality of glass plates 12 and 14 differing in the plate thickness are horizontally arranged and laminated so that the thicker glass plate is disposed closer to the convex curved surface of the glass laminate 50, whereby when laminated glass 60 is attached to a vehicle body as window glass for an automobile, the thicker glass plate is disposed closer to the car exterior side, whereby durability against impact from the car exterior e.g. by flying stones can be improved.

The pressure bonding step is a step of pressure bonding the laminated glass plates 12 and 14 and the interlayer 40 to form laminated glass 60 as shown in FIG. 4. The laminated glass 60 is obtained by putting the glass laminate 50 obtained in the lamination step into an autoclave, followed by heating and pressure bonding, and has a predetermined bent shape.

The process for producing laminated glass may further has a formation step of forming a functional material layer 8 (see FIG. 1) on the surface of the glass plate, in addition to the above forming step, lamination step and pressure bonding step. The functional material is not particularly limited and may, for example, be an electrically conductive material such as a metal material or a decorating material such as a heat resistant pigment.

In the formation step, an ink containing a binder and a solvent in addition to the functional material is applied to the surface of the glass plate and dried to form the functional material layer 8. A plural types of functional material layers 8 may be formed on the surface of one glass plate. The functional material layer 8 is formed in a predetermined pattern.

The formation step may be carried out prior to the forming step, and in such a case, the ink can be applied to the surface of flat glass, whereby good coating operation property is obtained. As the method of applying the ink, for example, a screen printing method, a die coating method or the like may be mentioned.

The functional material layer 8 when fired is baked on the surface of the glass plate to form a functional film 18 (see FIG. 1) containing the functional material. The functional film 8 may, for example, be an electrically conductive film or electrically conductive striae containing an electrically conductive material, and constitutes e.g. an antenna receiving electrical radiation for TV broadcasting, AM/FM broadcasting or PHS, heat electric wire for anti-icing or the like. Otherwise, the functional film 18 may be a decorating film containing a decorating material, which contains a heat resistant black pigment, and restricts visibility from outside or restricts transmission of sunlight.

(Details about Process for Producing Laminated Glass)

According to this embodiment, at least two glass plates 12 and 14 among the plurality of glass plates 12 and 14 constituting the laminated glass 60 have different plate thicknesses. The laminated glass shown in FIGS. 3 and 4 as an example is laminated glass having two glass plates, and the two glass plates 12 and 14 (i.e. glass plates 2 and 4) differing in the plate thickness have different viscosities, and at an any temperature between the annealing point and the softening point of the thick glass plate 12, the thick glass plate 12 has a lower viscosity than the thin glass plate 14.

Here, "the annealing point" means a temperature at which the viscosity of glass becomes $10^{13}$ dPa·s, and is determined e.g. by the composition of glass. The annealing point of soda lime glass is typically about 550° C. At a temperature lower than the annealing point, the glass plate undergoes substantially no heat deformation.

Further, "the softening point" means a temperature at which the viscosity of glass becomes $10^{7.65}$ dPa·s and is determined e.g. by the composition of glass. The softening point of soda lime glass is typically about 750° C. The bending temperature of the glass plate is set to the same temperature as the softening point or a temperature slightly lower than the softening point.

The viscosity of glass depends on e.g. the composition of glass and the β-OH value ($mm^{-1}$) indicating the moisture content, at the same glass temperature. In the case of soda lime glass, for example, the lower the content of alkali metal oxides (such as $Na_2O$ and $K_2O$) in the glass, and the lower the β-OH value ($mm^{-1}$), the higher the viscosity.

The β-OH value ($mm^{-1}$) is an index of the moisture content in glass, and the β-OH value of glass can be obtained by measuring the absorbance of a glass sample to light having a wavelength of from 2.75 to 2.95 μm, and dividing its maximum βmax by the thickness (mm) of the sample.

Further, the β-OH value ($mm^{-1}$) of a glass plate varies depending upon the amount of moisture in the material, the type (e.g. fuel oil, LNG or electricity) of a heat source for melting the material, the water vapor concentration in a melting tank, the retention time of molten glass in the melting tank, etc., and is preferably adjusted by a method of using a hydroxide instead of an oxide as the glass material (for example, magnesium hydroxide ($Mg(OH)_2$) is used instead of magnesium oxide (MgO) as a magnesium source). In this embodiment, the moisture content in the glass plate is from 0.1 to 0.4 by the β-OH value ($mm^{-1}$), preferably from 0.2 to 0.3.

The viscosity of glass is lower as the temperature of glass increases, with the same glass composition. The viscosity of glass is represented by the following formula (1) with the same glass composition. The following formula (1) is commonly called Fulcher formula:

$$\log_{10}\eta = A + \frac{B}{T - T_0} \quad (1)$$

$$A = \log_{10}\eta_0$$

In the formula (1), η is the viscosity (dPa·s) of glass, and T is the temperature (° C.) of glass. Further, A, $\eta_0$ (dPa·s), B (° C.) and $T_0$ (° C.) are respectively constants determined e.g. by the composition of glass.

Figure 5:
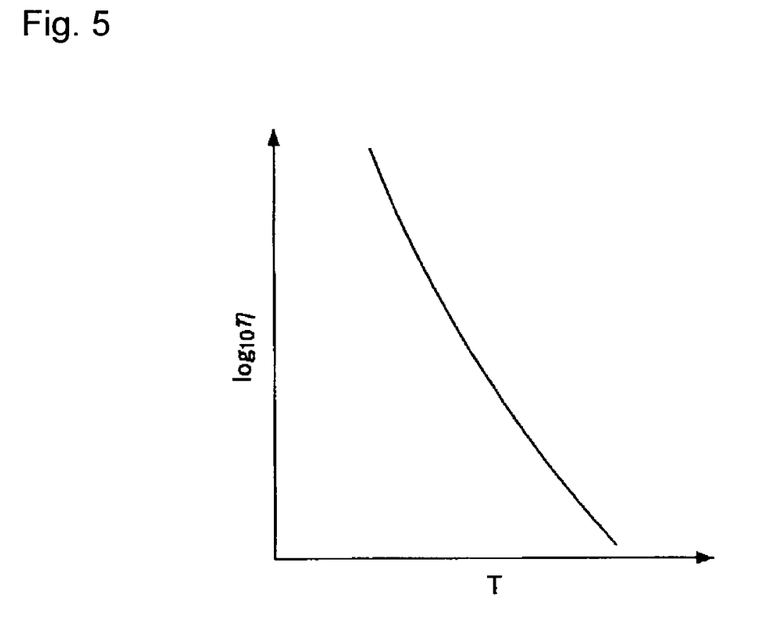
FIG. 5 is a graph schematically illustrating the relation between the viscosity and the temperature of the glass, calculated based on Fulcher formula.

FIG. 5 is a graph schematically illustrating the relation between the viscosity and the temperature of glass calculated based on Fulcher formula. In FIG. 5, the vertical axis represents the logarithm (to base 10) of the viscosity η of glass, and the horizontal axis represents the temperature T of glass. As shown in FIG. 5, with the same composition of glass, the higher T is, the lower η is.

The viscosity of glass at a predetermined temperature is measured by a so-called beam bending method (hereinafter referred to as "BB method"). The BB method is a measuring method suitable for measuring the viscosity at a predetermined temperature between the annealing point and the softening point.

Figure 6:
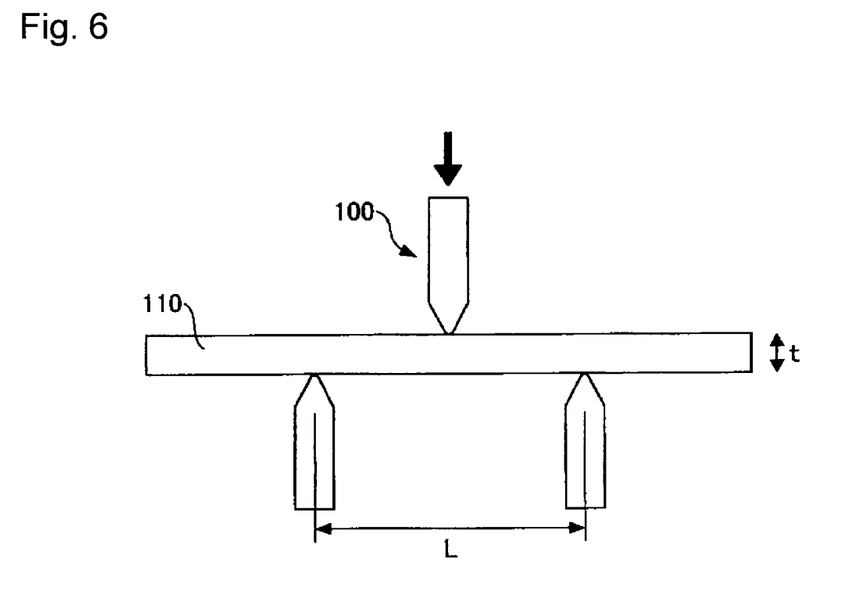
FIG. 6 is a view illustrating measurement of the viscosity by BB method.

FIG. 6 is a view illustrating measurement of the viscosity by BB method. As shown in FIG. 6, for the viscosity measurement by BB method, a three-point bending testing machine 100 is employed. A test piece 110 having a length of 50 mm and a plate thickness of 2 mm is horizontally supported at two support points (distance L=20 mm) and heated to a predetermined temperature. Then, at a center portion in the longitudinal direction of the test piece 110, a certain load (40 g) is applied, and the rate of deflection at the center portion in the longitudinal direction of the test piece is measured. Here, "the rate of deflection" means the displacement rate in the vertical direction. Then, the results of measurement of the rate of deflection and the like are substituted in the following formula (2) to calculate the viscosity of glass at a predetermined temperature:

$$\eta = \frac{G \times L^3}{2.4 \times I \times v} \times \left\{ M + \frac{\rho \times S \times L}{1.6} \right\} \quad (2)$$

In the formula (2), η is the viscosity (dPa·s) of glass, G is the gravitational acceleration (cm/sec$^2$), L is the distance (cm) between the two support points, I is the cross-sectional second moment (cm$^4$) of the test piece, v is the rate of deflection (cm/min) at the center portion of the test piece, M is the load (g) applied to the center portion in the longitudinal direction of the test piece, ρ is the density (g/cm$^3$) of glass, and S is the cross section (cm$^2$) of the test piece.

The formula (2) is modified to obtain the following formula (3):

$$v = \frac{G \times L^3}{2.4 \times I \times \eta} \times \left\{ M + \frac{\rho \times S \times L}{1.6} \right\} \quad (3)$$

As shown in the formula (3), the lower the viscosity of glass, the higher the rate of deflection of glass.

According to this embodiment, as described above, the two glass plates 12 and 14 (i.e. glass plates 2 and 4) differing in the plate thickness have different glass viscosities, and at an any temperature between the annealing point and the softening point of the thick glass plate 12, the thick glass plate 12 has a viscosity lower than the thin glass plate 14. Accordingly, the difference in the plate thickness can be compensated by the difference in the viscosity, and the two glass plates 12 and 14 differing in the plate thickness can easily be bent with good accuracy.

As an index representing the bendability of a glass plate having a plate thickness t (mm), the total deflection amount of the test piece 110 may be employed, which is obtained by heating the test piece 110 from 400° C. to 630° C. in a state where a certain load (50 gf) is applied to the test piece 110 having a plate thickness t (mm) using the three-point bending test machine 100 shown in FIG. 6. This total amount of deflection D (cm) is calculated from the following formula (4). The heating start temperature of the test piece 110 is set at 400° C. because the heat deformation of the test piece is negligibly small at a temperature of 400° C. or below. The test piece and the glass plate have the same glass composition, and have the same A ($\eta_0$), B and $T_0$.

$$D = \int_{400}^{630} \frac{v}{E} \, dT \quad (4)$$

In the formula (4), T is the temperature of the test piece. E is the heating rate (° C./min) of the test piece from 400° C. to 630° C. and is 10 (° C./min). v is the rate of deflection (cm/min) of the test piece, is a function with a variable T, and is represented by the following formula (5):

$$v = \frac{G \times L^3}{2.4 \times I \times \eta_0 \times 10^{\frac{B}{T-T_0}}} \times \left\{ M + \frac{\rho \times S \times L}{1.6} \right\} \quad (5)$$

The formula (5) is obtained by substituting the formula (1) in the formula (3), and L and I are determined e.g. by t. L and I are values at room temperature, since their temperature dependence is negligibly small.

ΔT (ΔT=$T_2$−$T_1$) which satisfies $D_1$=$D_2$ is shown in Table 1, wherein $D_1$ and $T_1$ are D and $T_0$ of a thick test piece (t=$t_1$), and $D_2$ and $T_2$ are D and $T_0$ of a thin test piece (t=$t_2$<$t_1$). Further, a combination of x, y and z which satisfies $D_1$=$D_2$ is shown in Table 1, wherein x is the plate thickness ratio of the two test pieces, y is the ratio of the logarithms of the viscosities of the two test pieces at the annealing point of the thick test piece (t=$t_1$), and z is the ratio of the logarithms of the viscosities of the two test pieces at the softening point of the thick test piece (t=$t_1$). The values of y and z are calculated by substituting ΔT and the like shown in Table 1 into the formula (4) (the formula (5) in detail)).

TABLE 1

| | t1 (mm) | t2 (mm) | ΔT (° C.) | x | y | z | D2/D1 |
|---|---|---|---|---|---|---|---|
| Ex. 1 | 2.0 | 1.6 | 8 | 0.8 | 1.033 | 1.022 | 1 |
| Ex. 2 | 2.0 | 1.1 | 21 | 0.55 | 1.092 | 1.058 | 1 |
| Ex. 3 | 1.9 | 1.7 | 4 | 0.89 | 1.016 | 1.011 | 1 |
| Ex. 4 | 1.8 | 1.3 | 12 | 0.72 | 1.051 | 1.033 | 1 |
| Ex. 5 | 1.8 | 1.1 | 18 | 0.61 | 1.078 | 1.050 | 1 |
| Ex. 6 | 2.1 | 1.6 | 10 | 0.76 | 1.042 | 1.027 | 1 |
| Ex. 7 | 2.1 | 1.1 | 23 | 0.52 | 1.101 | 1.064 | 1 |
| Ex. 8 | 1.9 | 1.25 | 15 | 0.66 | 1.064 | 1.041 | 1 |
| Ex. 9 | 2.1 | 0.7 | 37 | 0.33 | 1.172 | 1.107 | 1 |

In Table 1, the values A and B in the two test pieces are typical values of soda lime glass, specifically, A=1.525 and B=4,144 (° C.). Further, the value $T_1$ of the thick test piece (t=$t_1$) is a typical value of soda lime glass, and specifically $T_1$=270.6 (° C.). The values A and B are constant and $T_0$ alone is adjusted as mentioned above, since the dependence of A and B on the glass composition is small as compared with $T_0$.

In Table 1, the value x represents the ratio (t2/t1) of the plate thickness (t2) of the thin test piece to the plate thickness (t1) of the thick test piece at room temperature. The value y represents the ratio ($\log_{10} \eta_2 / \log_{10} \eta_1$) of the logarithm ($\log_{10} \eta_2$) of the viscosity of the thin test piece to the logarithm ($\log_{10} \eta_1$) of the viscosity of the thick test piece at the annealing point of the thick test piece. The value z represents the ratio ($\log_{10} \eta_4 / \log_{10} \eta_3$) of the logarithm ($\log_{10} \eta_4$) of the viscosity of the thin test piece to the logarithm ($\log_{10} \eta_3$) of the viscosity of the thick test piece at the softening point of the thick test piece.

Figure 7:
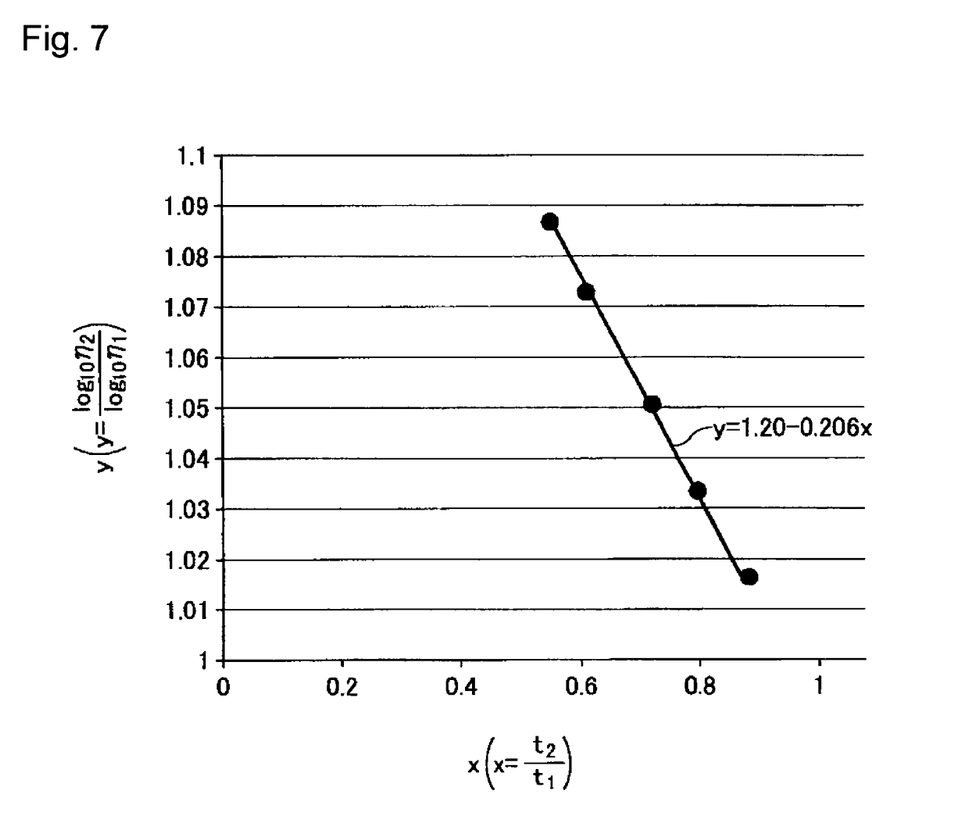
FIG. 7 is a graph illustrating the relation between x and y which satisfy $D_1=D_2$.
Figure 8:
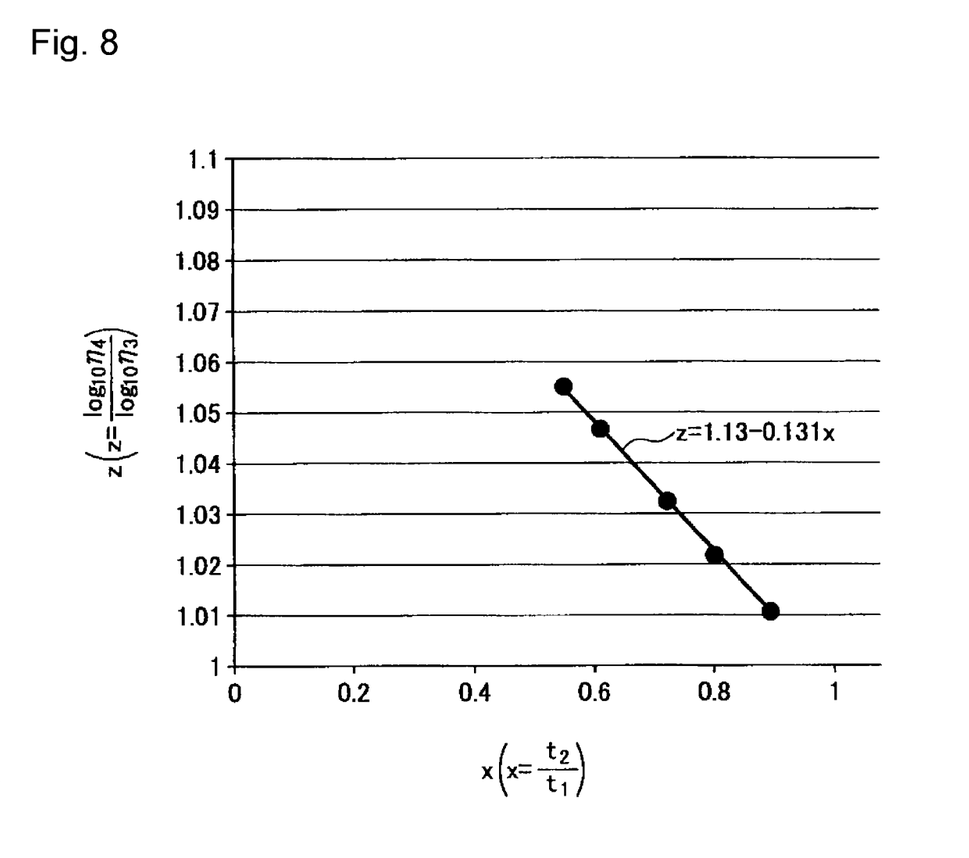
FIG. 8 is a graph illustrating the relation between x and z which satisfy $D_1=D_2$.

FIG. 7 is a graph illustrating the relation between x and y which satisfy $D_1$=$D_2$. FIG. 8 is a graph illustrating the relation between x and z which satisfy $D_1$=$D_2$.

As shown in FIG. 7, x and y which satisfy $D_1$=$D_2$ are substantially proportional to each other. The relation of x and y determined by the least-squares method is represented by y=1.20−0.206×x.

As shown in FIG. 8, x and z which satisfy $D_1$=$D_2$ are substantially proportional to each other. The relation of x and z determined by the least-squares method is represented by z=1.13−0.131×x.

Thus, the two glass plates 12 and 14 (i.e. glass plates 2 and 4) differing in the plate thickness preferably satisfy the following formulae (6) and (7) so that they are in conformity with each other in the bendability in the forming step.

$$1 < y < b_1 − 0.206 \times x \quad (6)$$

$$1 < z < c_1 − 0.131 \times x \quad (7)$$

In the formulae (6) and (7), x, y and z have the same meanings as in Table 1, and x is the plate thickness ratio of the two glass plates 12 and 14 at room temperature, y is the ratio of the logarithms of the viscosities of the two glass plates 12 and 14 at the annealing point of the thick glass plate 12, and z is the ratio of the logarithms of the viscosities of the two glass plates 12 and 14 at the softening point of the thick glass plate 12.

In the formulae (6) and (7), $b_1=1.22$ and $c_1=1.15$. In a case where $y \geq b_1 - 0206 \times x$ and/or $z \geq c_1 - 0131 \times x$, the bending amount of the thick glass plate is larger than the bending amount of the thin glass plate in the forming step. Accordingly, if the two glass plates are laminated so that the concave curved surface of the thick glass plate and the convex curved surface of the thin glass plate face each other, pressure bonding failure is likely to occur between the two glass plates. $b_1$ is preferably 1.21, more preferably 1.20. $c_1$ is preferably 1.14, more preferably 1.13.

The two glass plates differing in the plate thickness more preferably satisfy the following formulae (8) and (9), in addition to the above formulae (6) and (7). Here, the formula (8) is effectively employed only when x is small to a certain extent, and specifically, effectively employed only when $1 \leq b_2 - 0.206 \times x$. Similarly, the formula (9) is effectively employed only when x is small to a certain extent, and specifically, effectively employed only when $1 \leq c_2 - 0.131 \times x$ $$b_2 - 0.206 \times x < y \quad (8)$$

$$c_2 - 0.131 \times x < z \quad (9)$$

In the formulae (8) and (9), $b_2=1.11$ and $c_2=1.06$. When $y > b_2 - 0.206 \times x$ and $z > c_2 - 0.131 \times x$, the curvature of the two glass plates in the forming step can sufficiently be matched even when x is small. $b_2$ is preferably 1.12, more preferably 1.13. $c_2$ is preferably 1.07, more preferably 1.08.

Figure 9:
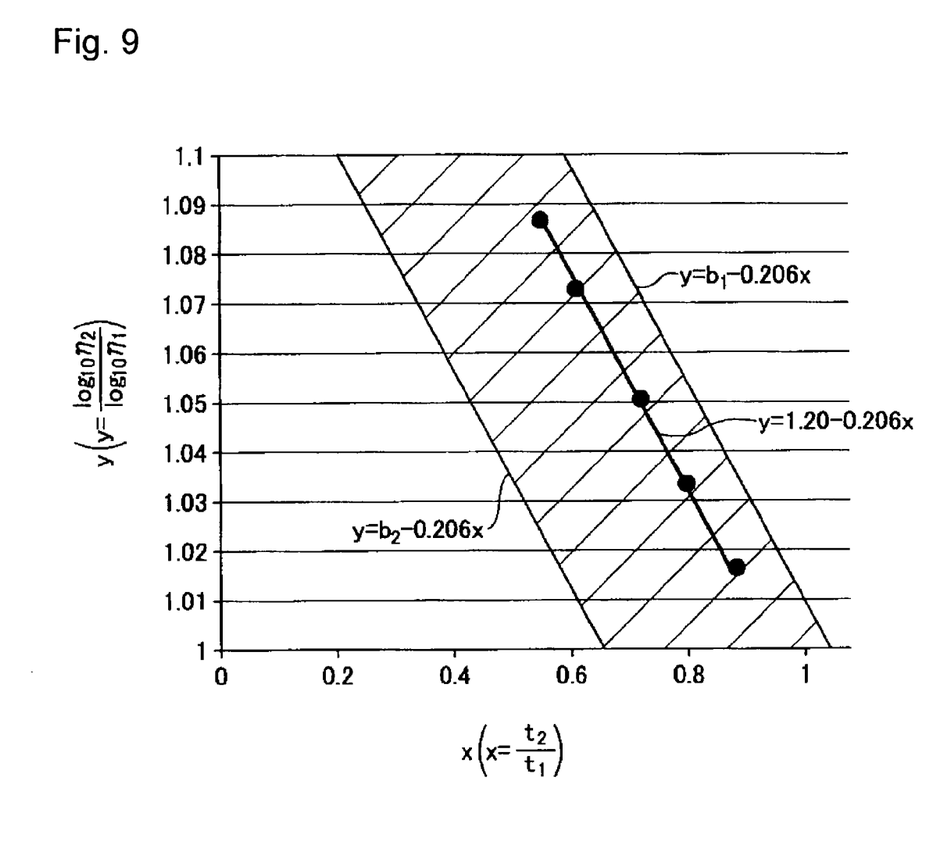
FIG. 9 is a graph illustrating the relation between x and y which satisfy the formulae (6) and (8).

FIG. 9 is a graph illustrating the relation between x and y which satisfy the formulae (6) and (8). In FIG. 9, a region where the formulae (6) and (8) are satisfied is indicated by oblique lines. Further, in FIG. 9, the relation between x and y shown in Table 1 is plotted. As shown in FIG. 9, the formula (8) is effectively on when x is small to a certain extent.

Figure 10:
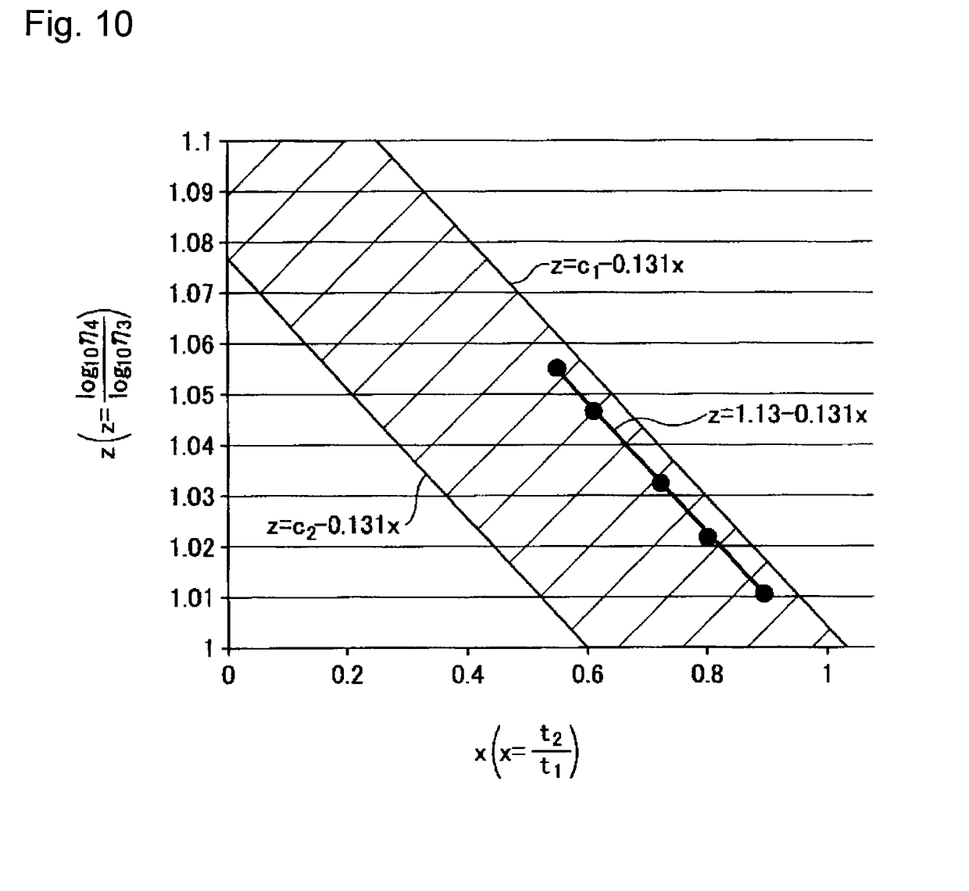
FIG. 10 is a graph illustrating the relation between x and z which satisfy the formulae (7) and (9).

FIG. 10 is a graph illustrating the relation between x and z which satisfy the formulae (7) and (9). In FIG. 10, the region where the formulae (7) and (9) are satisfied is indicted by oblique lines. Further, in FIG. 10, the relation between x and z shown in Table 1 is plotted. As shown in FIG. 10, the formula (9) is effective only when x is small to a certain extent.

For comparison with Table 1, $D_2/D_1$ and $\Delta T$ when the combination of x, y and z does not satisfy at least one of the formula (6) to (9) are shown in Table 2.

TABLE 2

|  | $t_1$ (mm) | $t_2$ (mm) | $\Delta T$ (° C.) | x | y | z | $D_2/D_1$ |
|---|---|---|---|---|---|---|---|
| Ex. 1 | 2.0 | 1.6 | 0 | 0.80 | 1 | 1 | 1.95 |
| Ex. 2 | 2.0 | 1.1 | 0 | 0.55 | 1 | 1 | 6.01 |
| Ex. 3 | 1.9 | 1.7 | 0 | 0.89 | 1 | 1 | 1.40 |
| Ex. 4 | 1.8 | 1.3 | 0 | 0.72 | 1 | 1 | 2.65 |
| Ex. 5 | 1.8 | 1.1 | 0 | 0.61 | 1 | 1 | 4.38 |
| Ex. 6 | 2.1 | 1.6 | 0 | 0.76 | 1 | 1 | 2.26 |
| Ex. 7 | 2.1 | 1.1 | 0 | 0.52 | 1 | 1 | 6.96 |
| Ex. 8 | 1.9 | 1.25 | 0 | 0.66 | 1 | 1 | 3.51 |
| Ex. 9 | 2.1 | 0.7 | 0 | 0.33 | 1 | 1 | 26.98 |

In Table 2, $b_1=1.20$, $c_1=1.13$, $b_2=1.13$ and $c_2=1.08$

The two glass plates 12 and 14 (i.e. glass plates 2 and 4) differing in the plate thickness preferably satisfy the formula $0.3 \leq x \leq 0.9$. When x is at most 0.9, the laminated glass 60 can be made sufficiently thin while the strength and the resistance to flying stones of the thick glass plate 12 (the glass plate on the car exterior side) are maintained. Further, when x is at least 0.3, the strength of the thin glass plate 14 can sufficiently be secured. In view of the balance between the weight saving by thickness reduction and the strength of the glass plate on the car exterior side against flying stones and the like to satisfy the safety standards in developed countries, $0.3 \leq x \leq 0.76$ is more preferred, and $0.33 \leq x \leq 0.66$ is further preferred. In such a case, in the case of soda lime glass commonly used for window glass for an automobile, the plate thickness of the glass plate to be disposed on the car exterior side of the laminated glass is preferably thicker than 1.6 mm, more preferably at least 1.8 mm. Further, the plate thickness of the glass plate to be disposed on the car interior side is preferably thinner than 1.6 mm, more preferably thinner than 1.3 mm, particularly preferably thinner than 1.1 mm. On the other hand, when it is thicker than 0.7 mm, the handling of the glass plate tends to be easy, and when it is thicker than 1 mm, the compatibility with the existing equipment for production of window glass for an automobile tends to be high, such being favorable.

Further, the plate thickness difference between the thick plate and the thin plate is preferably at least 0.5 mm, more preferably at least 0.65 mm, whereby weight saving is possible while the strength and the resistance to flying stones are secured.

Further, the value y is preferably $1.017 \leq y$, more preferably $1.02 \leq y$, further preferably $1.03 \leq y$.

The laminated glass 60 is window glass for a vehicle, and as shown in FIG. 4 for example, the number of the glass plates 12 and 14 constituting the laminated glass 60 may be two, and the convex curved surface of the laminated glass 60 is constituted by the convex curved surface of the thick glass plate 12. When such laminated glass 60 is attached to a vehicle, the thick glass plate 12 is disposed on the car exterior side, whereby the laminated glass 60 is less likely to be broken when flying objects such as small stones from outside collide with the automobile.

In the above embodiment, the laminated glass has two glass plates, however, it may have three or more glass plates so long as two glass plates in the laminated glass have different plate thicknesses. In such a case, the other glass plate other than the two glass plates may have a plate thickness different from both of the two glass plates, or may have the same plate thickness as one of them. In the former case, in all the combinations of the two glass plates differing in the plate thickness, the two glass plates are preferably such that the thick glass plate has a lower viscosity than the thin glass plate at an optional temperature between the annealing point and the softening point of the thick glass plate. In the latter case, the glass plates having the same plate thickness preferably have the same glass viscosity.

EXAMPLES

Now, the present invention will be described in further detail with reference to Examples. However, it should be understood that the present invention is by no means restricted to such specific Examples.

Example 1

In Example 1, two flat glass plates (soda lime glass) are prepared. The two glass plates have different plate thicknesses, the thick glass plate has a plate thickness of 2.0 mm, and the thin glass plate has a plate thickness of 1.1 mm. Further, the two glass plates have different compositions, and as a result of analysis of the composition of each glass plate by fluorescent X-ray analysis, the thick glass plate has a $Na_2O$ content higher than that of the thin glass plate.

Then, using test pieces having the same compositions as the respective glass plates, the viscosities at a plurality of temperatures are obtained by BB method as shown in FIG. 6, and A, B and $T_0$ in the formula (1) are determined by the least-squares method so that the difference with the formula (1) as a model formula becomes smallest. As a result, of the test piece having the same composition as the thick glass plate, A=1.525, B=4144 and $T_0$=270.8. Further, of the test piece having the same composition as the thin glass plate, A=1.525, B=4144 and $T_0$=290.8. The combination of y and z calculated based on the combination of such A, B and $T_0$ is y=1.921 and z=1.056. Further, x is 0.55.

Then, to the surface of the thin glass plate, an ink obtained by mixing glass flit, a heat resistant black pigment and an organic vehicle is applied and dried to form a decorating material layer.

Then, the glass plate having a thickness of 2.0 mm and the glass plate having a thickness of 1.1 mm are overlaid in this order on a ring mold as shown in FIG. 1 so that the decorating material layer is disposed on the upper side of the thin glass plate. Before the two glass plates are overlaid, a release agent containing a ceramic powder is applied between the two glass plates.

Then, the ring mold on which the two glass plates are overlaid is moved from an inlet of a heating furnace to a forming zone via a pre-heating zone, whereby the softened two glass plates are bent into a shape along the ring mold by gravity and in addition, the decorating material layer is subjected to heat treatment for removal of the binder and then fired to form a decorating film. In this state, the convex curved surface of the thin glass plate and the concave curved surface of the thick glass plate face each other. Then, the ring mold is moved from the forming zone to the annealing zone and then discharged from the outlet of the heating furnace.

Then, on the ring mold, the two glass plates are sufficiently cooled, and they are taken out from the ring mold, the release agent is removed by cleaning, and the outer appearance of each glass plate is visually observed. As a result, no defect resulting from irregularities due to the ceramic powder contained in the release agent is confirmed, and there is no problem in the visual quality.

Then, the concave curved surface of the thick glass plate and the convex curved surface of the thin glass plate are disposed to face each other, and the two glass plates are laminated with an interlayer comprising polyvinyl butyral (PVB) interposed therebetween to form a glass laminate (non-pressure bonded product). The glass laminate is heated and pressure bonded in an autoclave to obtain laminated glass having a predetermined bent shape.

The obtained laminated glass is visually observed, whereupon no pressure bonding failure between the adjacent glass plates is observed, and no crack is confirmed.

Example 2

In Example 2, laminated glass is prepared in the same manner as in Example 1 except that the plate thickness of the thin glass plate is 1.6 mm, and the glass composition of the thin glass plate is changed.

Prior to the forming step, using a test piece having the same composition as the thin glass plate in Example 2, the viscosities at a plurality of temperatures are obtained by BB method as shown in FIG. 6, and A, B and $T_0$ in the formula (1) are determined by the least-squares method so that the difference with the formula (1) as the model formula becomes smallest. As a result, of the test piece having the same composition as the thin glass plate, A=1.525, B=4144 and $T_0$=278.6. The composition of y and z calculated based on the combination of A, B and $T_0$ is y=1.826 and z=1.022. Further, x is 0.8.

After the forming step, on the ring mold, the two glass plates are sufficiently cooled, and they are taken out from the ring mold, the release agent is removed by cleaning, and the outer appearance of each glass plate is visually observed. As a result, no defect resulting from irregularities due to the ceramic powder contained in the release agent is confirmed, and there is no problem in the visual quality.

Further, after the pressure bonding step, the obtained laminated glass is visually observed, whereupon no pressure bonding failure between the adjacent glass plates is observed, and no crack is confirmed.

Example 3

In Example 3, laminated glass is prepared in the same manner as in Example 1 except that the compositions of the thin glass plate and the thick glass plate are changed as identified in Table 3.

Prior to the forming step, using test pieces having the same compositions as the thin glass plate and the thick glass plate in Example 3, the viscosities at a plurality of temperatures are obtained by BB method as shown in FIG. 6, and A, B and $T_0$ in the formula (1) are determined by the least-squares method so that the difference with the formula (1) as the model formula is smallest. As a result, as shown in Table 3, of the test piece having the same composition as the thin glass plate, A=2.158, B=4791 and $T_0$=243.6, and of the test piece having the same composition as the thick glass plate, A=1.617, B=4230 and $T_0$=261.6.

After the forming step, on the ring mold, the two glass plates are sufficiently cooled, and they are taken out from the ring mold, the release agent is removed by cleaning, and the outer appearance of each glass plate is visually observed. As a result, no defect resulting from irregularities due to the ceramic powder contained in the release agent is confirmed, and there is no problem in the visual quality.

Further, after the pressure bonding step, the obtained laminated glass is visually observed, whereupon no pressure bonding failure between the adjacent glass plates is observed, and no crack is confirmed.

Example 4

In Example 4, laminated glass is prepared in the same manner as in Example 1 except that the compositions of the thin glass plate and the thick glass plate are changed as identified in Table 3.

Prior to the forming step, using test pieces having the same compositions as the thin glass plate and the thick glass plate in Example 4, the viscosities at a plurality of temperatures are obtained by BB method as shown in FIG. 6, and A, B and $T_0$ in the formula (1) are determined by the least-squares method so that the difference with the formula (1) as the model formula is smallest. As a result, as shown in Table 3, of the test piece having the same composition as the thin glass plate, A=1.270, B=4119 and $T_0$=274.3, and of the test piece having the same composition as the thick glass plate, A=−0.110, B=2976 and $T_0$=312.0.

After the forming step, on the ring mold, the two glass plates are sufficiently cooled, and they are taken out from the ring mold, the release agent is removed by cleaning, and the outer appearance of each glass plate is visually observed. As a result, no defect resulting from irregularities due to the ceramic powder contained in the release agent is confirmed, and there is no problem in the visual quality.

Further, after the pressure bonding step, the obtained laminated glass is visually observed, whereupon no pressure bonding failure between the adjacent glass plates is observed, and no crack is confirmed.

TABLE 3

| (mass %) | Ex. 3 (example of combination) | | Ex. 4 (example of combination) | |
|---|---|---|---|---|
| | Thin glass plate | Thick glass plate | Thin glass plate | Thick glass plate |
| $SiO_2$ | 72.2 | 73.0 | 71.7 | 73.3 |
| $Al_2O_3$ | 1.8 | 0.1 | 2.5 | 0.8 |
| CaO | 8.1 | 8.6 | 8.5 | 9.8 |
| MgO | 4.2 | 3.8 | 3.6 | 0.4 |
| $Na_2O$ | 12.9 | 13.7 | 12.3 | 14.0 |
| $K_2O$ | 0.6 | 0.1 | 1.0 | 0.6 |
| $Na_2O + K_2O$ | 13.5 | 13.8 | 13.3 | 14.6 |
| $TiO_2$ | 0.02 | 0.03 | 0.02 | 0.04 |
| $CeO_2$ | 0 | 0 | 0 | 0 |
| $Fe_2O_3$ | 0.08 | 0.57 | 0.08 | 0.86 |
| $SO_3$ | 0.1 | 0.1 | 0.3 | 0.2 |
| (total) | 100 | 100 | 100 | 100 |
| Softening point (° C.) | 734.6 | 720.5 | 738.7 | 709.4 |
| Annealing point (° C.) | 549.6 | 541.5 | 553.2 | 534.1 |
| Distortion point (° C.) | 504.6 | 499 | 510.1 | 497 |
| A | 2.158 | 1.617 | 1.270 | −0.110 |
| B | 4791 | 4230 | 4119 | 2976 |
| $T_0$ | 243.6 | 261.6 | 274.3 | 312.0 |

Comparative Example 1

In Comparative Example 1, laminated glass is prepared in the same manner as in Example 1 except that the glass composition of the thin glass plate is changed to be the same as the glass composition of the thick glass plate.

After the forming step, on the ring mold, the two glass plates are sufficiently cooled, and they are taken out from the ring mold, the release agent is removed by cleaning, and the outer appearance of each glass plate is visually observed. As a result, defects resulting from irregularities due to the ceramic powder contained in the release agent are observed, and a perspective distortion is observed.

Further, after the pressure bonding step, the obtained laminated glass is visually observed, whereupon pressure bonding failure between the adjacent glass plates is confirmed, and cracks are also confirmed.

INDUSTRIAL APPLICABILITY

According to the present invention, it is possible to provide laminated glass excellent in the quality and the cost and its production process capable of easily bending glass plates differing in the plate thickness with good accuracy, whereby the distortion of the glass plates is reduced, and the laminated glass of the present invention is particularly useful as laminated glass for an automobile.

This application is a continuation of PCT Application No. PCT/JP2012/058994, filed on Apr. 2, 2012, which is based upon and claims the benefit of priorities from Japanese Patent Application No. 2011-082103 filed on Apr. 1, 2011 and Japanese Patent Application No. 2011-212238 filed on Sep. 28, 2011. The contents of those applications are incorporated herein by reference in its entirety.

REFERENCE SYMBOLS

2: thick glass plate
4: thin glass plate
8: functional material layer
12: bent thick glass plate
14: bent thin glass plate
18: functional film
20: ring mold
40: interlayer
50: glass laminate (non-pressure bonded product)
60: laminated glass

What is claimed is:

1. A laminated glass comprising a plurality of glass plates bent into a predetermined shape, and an interlayer interposed between the plurality of glass plates, at least two glass plates among the plurality of glass plates being a thick glass plate and a thin glass plate differing in the plate thickness;
   wherein at any temperature between the annealing point and the softening point of the thick glass plate, the thick glass plate between the two glass plates differing in the plate thickness, has a lower viscosity than the thin glass plate, and
   wherein the two glass plates differing in the plate thickness satisfy the formula $1<y<(1.22-0.206\times x)$ and the formula $1<z<(1.15-0.131\times x)$,
   wherein x ($x=t2/t1$) is the ratio of the plate thickness (t2) of the thin glass plate to the plate thickness (t1) of the thick glass plate at room temperature;
   y ($y=\log_{10} \eta 2/\log_{10} \eta 1$) is the ratio of the logarithm ($\log_{10} \eta 2$) of the viscosity of the thin mass plate to the logarithm ($\log_{10} \eta 1$) of the viscosity of the thick glass plate, at the annealing point of the thick glass plate; and
   z ($z=\log_{10} \eta 4/\log_{10} \eta 3$) is the ratio of the logarithm ($\log_{10} \eta 4$) of the viscosity of the thin glass plate to the logarithm ($\log_{10} \eta 3$) of the viscosity of the thick glass plate, at the softening point of the thick glass plate.

2. The laminated glass according to claim 1, wherein the two glass plates differing in the plate thickness have different glass compositions.

3. The laminated glass according to claim 1, wherein the two glass plates differing in the plate thickness satisfy the formula $1<y<(1.20-0.206\times x)$ and the formula $1<z<(1.13-0.131\times x)$.

4. The laminated glass according to claim 1, wherein the two glass plates differing in the plate thickness satisfy the formula $0.3 \leq x \leq 0.9$.

5. The laminated glass according to claim 1, wherein the two glass plates differing in the plate thickness satisfy the formula $1.017 \leq y$.

6. The laminated glass according to claim 1, wherein the laminated glass is window glass for a vehicle, the number of the glass plates constituting the laminated glass is two, and a convex curved surface of the laminated glass is constituted by a convex curved surface of the thick glass plate.

7. The laminated glass according to claim 1,
   wherein the thin glass plate is a soda lime glass plate having a composition comprising, as calculated as oxides:
   $Al_2O_3$: 0 to 3.5 mass %, and
   $Na_2O$ and $K_2O$ in total: 12.0 to 14.5 mass %; and
   the thick glass plate is a soda lime glass plate having a composition comprising, as calculated as oxides:
   $Al_2O_3$: 0 to 2.0 mass %, and
   $Na_2O$ and $K_2O$ in total: 13.0 to 15.5 mass %.

8. The laminated glass according to claim 1,
   wherein the thin glass plate is a glass plate having a composition comprising, as calculated as oxides:

SiO$_2$: 68.0 to 75.0 mass %,
Al$_2$O$_3$: 0 to 3.5 mass %,
CaO: 7.0 to 13.0 mass %,
MgO: 0 to 7.0 mass %,
Na$_2$O: 12.0 to 15.0 mass %,
K$_2$O: 0 to 3.0 mass %, and
Na$_2$O and K$_2$O in total: 12.0 to 14.5 mass %; and
the thick glass plate is a glass plate having a composition comprising, as calculated as oxides:
SiO$_2$: 68.0 to 75.0 mass %,
Al$_2$O$_3$: 0 to 2.0 mass %,
CaO: 7.0 to 13.0 mass %,
MgO: 0 to 7.0 mass %,
Na$_2$O: 12.0 to 15.0 mass %,
K$_2$O: 0 to 3.0 mass %, and
Na$_2$O and K$_2$O in total 13.0 to 15.5 mass %.

9. The laminated glass according to claim 1, wherein the β-OH value (mm-1) is from 0.1 to 0.4.

10. A process for producing the laminated glass of claim 1, which comprises:
heating said plurality of glass plates to the vicinity of the softening point and bending them into a predetermined shape to provide a plurality of bent glass plates;
laminating the plurality of bent glass plates with an interlayer interposed there between to provide laminated glass plates and an interlayer; and
pressure bonding the laminated glass plates and the interlayer to form laminated glass.

11. The process according to claim 10, wherein the two glass plates differing in the plate thickness have different glass compositions.

12. The process according to claim 10, wherein the two glass plates differing in the plate thickness satisfy the formula 0.3≤x≤0.9.

13. The process according to claim 10, wherein the thin glass plate is a glass plate having a composition comprising, as calculated as oxides:
SiO$_2$: 68.0 to 75.0 mass %,
Al$_2$O$_3$: 0 to 3.5 mass %,
CaO: 7.0 to 13.0 mass %,
MgO: 0 to 7.0 mass %,
Na$_2$O: 12.0 to 15.0 mass %,
K$_2$O: 0 to 3.0 mass %, and
Na$_2$O and K$_2$O in total: 12.0 to 14.5 mass %; and
the thick glass plate is a glass plate having a composition comprising, as calculated as oxides:
SiO$_2$: 68.0 to 75.0 mass %,
Al$_2$O$_3$: 0 to 2.0 mass %,
CaO: 7.0 to 13.0 mass %,
MgO: 0 to 7.0 mass %,
Na$_2$O: 12.0 to 15.0 mass %,
K$_2$O: 0 to 3.0 mass %, and
Na$_2$O and K$_2$O in total: 13.0 to 15.5 mass %.

14. The process according to claim 10, wherein the β-OH value (mm-1) is from 0.1 to 0.4.

15. The laminated glass according to claim 1, wherein the two glass plates differing in the plate thickness satisfy the formula 0.3≤x≤0.9 and the formula 1.017≤y.

16. The laminated glass according to claim 3, wherein the laminated glass is window glass for a vehicle, the number of the glass plates constituting the laminated glass is two, and a convex curved surface of the laminated glass is constituted by a convex curved surface of the thick glass plate.

* * * * *